United States Patent
Slen et al.

(10) Patent No.: US 7,783,501 B2
(45) Date of Patent: Aug. 24, 2010

(54) SUBSTANTIATION PROCESS FOR FLEXIBLE SPENDING ACCOUNTS OR SIMILAR ACCOUNTS WHERE ELECTRONIC BENEFIT CARDS ARE USED

(75) Inventors: Benjamin E. Slen, Louisville, KY (US); Lois E. Gargotto, Loisville, KY (US); Lisa M. Van Den Plas, Suamico, WI (US); Carol J. Baker, Prospect, KY (US); Kyle M. Burns, Columbus, IN (US)

(73) Assignee: Humana Inc., Louisville, KY (US)

( * ) Notice: Subject to any disclaimer, the term of this patent is extended or adjusted under 35 U.S.C. 154(b) by 763 days.

(21) Appl. No.: 11/646,193

(22) Filed: Dec. 27, 2006

(65) Prior Publication Data
US 2008/0156868 A1 Jul. 3, 2008

(51) Int. Cl.
G06Q 10/00 (2006.01)
G06Q 40/00 (2006.01)
G06F 19/00 (2006.01)

(52) U.S. Cl. .................................. 705/2; 705/3; 705/4
(58) Field of Classification Search .................. 705/39, 705/2–4; 235/380
See application file for complete search history.

(56) References Cited

U.S. PATENT DOCUMENTS

2004/0249745 A1* 12/2004 Baaren ........................ 705/39
2005/0121511 A1* 6/2005 Robbins et al. ............. 235/380

OTHER PUBLICATIONS

IRS Revenue Ruling 2003-43, May 16, 2005.*

* cited by examiner

Primary Examiner—Robert W Morgan
Assistant Examiner—Joseph Burgess
(74) Attorney, Agent, or Firm—James C. Eaves, Jr.; Greenebaum Doll & McDonald PLLC; Brian W. Chellgren

(57) ABSTRACT

A method of transaction approval and substantiation employing accumulator logic for medical, dental, and vision claims. For example, a health care plan member may utilize an electronic payment card to pay for various health care related expenses where that electronic payment card is deducting from that member's flexible spending account, health reimbursement arrangement, or other such accounts. For substantiation of a card transaction, in addition to copay matching, paid claim matching, and recurring transaction matching for medical, dental, and vision claims, the method of the current invention further employs accumulator logic processing where the transaction is substantiated if the card swipe amount for that transaction is less than or equal to the sum in an accumulator for the previously paid claims in the appropriate medical, dental, or vision claim area.

20 Claims, 2 Drawing Sheets

SUBSTANTIATION PROCESS FOR FLEXIBLE SPENDING ACCOUNTS OR SIMILAR ACCOUNTS WHERE ELECTRONIC BENEFIT CARDS ARE USED

BACKGROUND OF THE INVENTION

The consumers of health care often have accounts, such as flexible spending accounts, where they can use an electronic benefit card, such as a debit card associated with the flexible spending account, in purchasing goods and services. This invention relates to an improved automatic substantiation process, where it can be determined that the consumer is properly using the electronic benefit card to purchase goods and services allowed by law. This invention provides for accumulating paid claims and card swipes by various categories and comparing the like category paid claim accumulator values to the card swipe accumulator values.

SUMMARY OF THE INVENTION

Under current electronic payment card arrangements, a large number of otherwise eligible claims fail to qualify for the somewhat narrow auto-adjudication standards set forth in the Internal Revenue Service ("IRS") Revenue Rule 2003-43, or "Rev. Rul. 2003-43" and subsequent Revenue Rule 2006-69, or "Rev. Rul. 2006-69", (i.e., copay match, recurring expense or real time substantiation). In many cases, the charges fail to fit one of the three established categories because, for example, copay amounts for multiple family members are combined in one card transaction, or card transactions for coinsurance or deductible amounts.

This invention increases the utility of electronic benefit cards. The arrangement incorporates non-controversial automated substantiation (for example, explanation of benefits ("EOB") rollover) concepts and blends them with electronic payment card techniques to create a hybrid electronic benefit card arrangement. Under this arrangement, amounts for claims that are adequately substantiated under non-electronic payment card techniques (e.g., EOB rollover) create an eligible expense paid claims accumulator. Rev. Rul. 2003-43 confirms and Rev. Rul. 2006-69 upholds that expenses can be adequately adjudicated based on a "rollover" of EOB information from the primary medical plan. This accumulated amount is then disbursed as additional claims are electronically submitted by an electronic benefit card swipe. The benefit card is programmed consistent with the requirements of Rev. Rul. 2003-43 and Rev. Rul. 2006-69 so that only expenses incurred at eligible health care merchants are approved. Moreover, separate accumulators may be established under the account so that different paid claims accumulator amounts may be maintained and monitored for different types of healthcare expenses (for example, medical, vision and dental). In no event is the amount of funds disbursed (without additional paper substantiation) greater than the paid claims accumulator amount for the particular expense category.

Pre-requisite Steps to Establish the Arrangement: Participants in the arrangement sign a participation agreement (likely as part of FSA enrollment materials) where they agree that amounts processed based on the EOB rollover arrangement will not be submitted for reimbursement under any other arrangement. The agreement not to submit claims anywhere else is contemporaneously confirmed each time an amount is disbursed by electronic payment card swipe—for example, the back of the card includes a legend to the effect that amounts attributable to the card swipe (as well as the paid claims accumulator established by the EOB) will not be submitted for reimbursement under any other source. The paid claims accumulator is established by the program administrator so that only unreimbursed deductible, copayment, and co-insurance amounts from an affiliated health care provider are considered.

Rationale for Approach: The paid claims accumulator reflects eligible medical expenses appropriately adjudicated by the program administrator. Indeed, the electronic benefit card merely provides a convenient means to access pre-adjudicated amounts. Thus, at any time, an amount up to the total of the paid claims accumulator could be disbursed consistent with IRS requirements. Upon a swipe of the electronic benefit card, the participant makes a request for disbursement which then reduces the paid claims accumulator amount.

The proposed arrangement satisfies the substantiation requirements imposed by IRS under Rev. Rul. 2003-43, Rev. Rul. 2006-69 and Treas. Prop. Regs. §1.125-2, Q&A-7(b)(5) claims substantiation. The paid claims accumulator amounts disbursed have been pre-adjudicated by the program administrator with a written statement from a third party indicating that a medical expense has been incurred and the amount of the medical expense (for example, the EOB that is used to create the paid claims accumulator). Moreover, at the time of the benefit card swipe, a contemporaneous certification is made that the amount reimbursed (i.e., part of the paid claims accumulator) has not been reimbursed and will not be submitted for reimbursement under any other source. Thus, amounts paid under the proposed arrangement should be excludable (from income) under the Internal Revenue Code §105(b).

Even further, the present invention is for a method attempting to substantiate at least one approved transaction, comprising the steps of: maintaining at least one accumulator containing a variable A which represents the difference in previously substantiated amounts and approved transaction amounts from a specific date forward; and, attempting to substantiate an approved transaction which occurred on a transaction date, the approved transaction being for an amount B, the approved transaction not otherwise being substantiated in a period of X days from the transaction date, and substantiating the approved transaction only if amount B does not exceed a value of variable A at the time of attempting transaction substantiation. The specific date is typically the start of a plan year. Further, in the step of maintaining at least one accumulator, at least one of a medical accumulator, a vision accumulator, and a dental accumulator can be maintained; where the approved transaction to be substantiated is identified as a medical, a vision, or a dental transaction category; and where the attempted substantiation of the approved transaction amount B is against the value of the appropriate accumulator variable A for that transaction category. Also, if amount B exceeds a value of variable A at the time of attempting transaction substantiation, the approved transaction is not substantiated at that time and the method can include initiating a request process for member receipt for manual substantiation.

Even further, where, prior to the step of attempting to substantiate, for the period of X days, other processes are used to attempt to otherwise substantiate the approved transaction; those other processes including a copay matching logic process, a paid claims matching logic process, and a recurring transaction matching logic process. The copay matching logic process substantiates the approved transaction if the amount B is an exact match to a copay amount of record. The paid claim matching logic process substantiates the approved transaction or multiple approved transactions if either the approved transaction amount B or the sum of multiple approved transactions from a same location is an exact match to a single paid claim amount or sums of multiple paid claim amounts. The recurring transaction matching logic process substantiates the approved transaction if the transaction amount B is at least the third transaction for that exact amount B from a same location.

BRIEF DESCRIPTION OF THE DRAWINGS

A better understanding of the present invention will be had upon reference to the following description in conjunction with the accompanying drawings, wherein.

DETAILED DESCRIPTION OF THE PREFERRED EMBODIMENT

Figure 1:
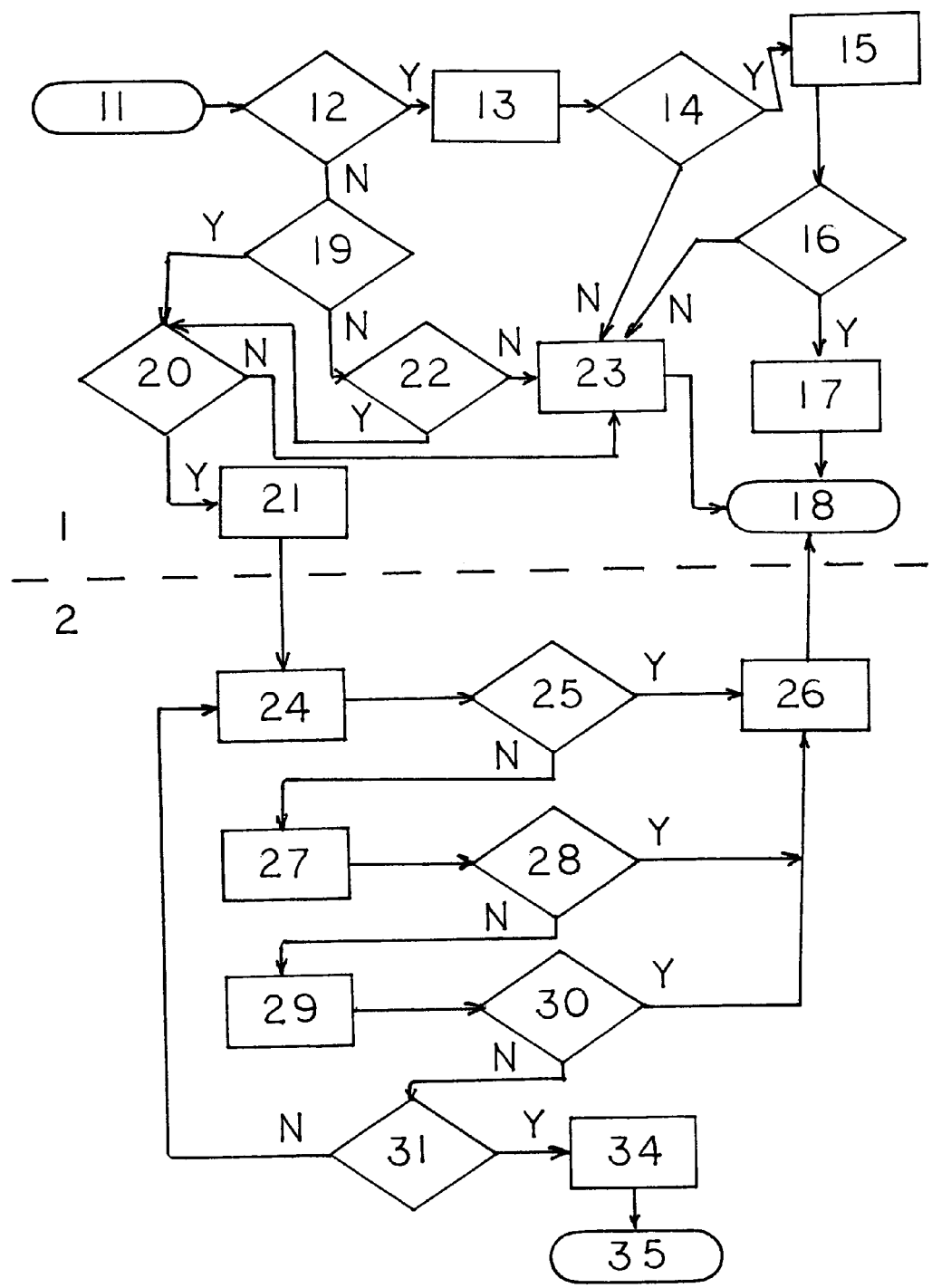
FIG. 1 shows Humana Inc.'s ("Humana") transaction approval and substantiation logic without accumulator logic for substantiation.

Definitions:

HAC—The HumanaAccess card has medical account fund debit capacity.

Combined HumanaAccess card—This is the card that includes medical ID information and FSA/HRA stored value capability.

HSA—Health Savings Account, an account that is a tax-advantaged savings plan to cover current and future medical expenses.

PCA—Personal Care Account; an account that is funded with employer pre-tax dollars on behalf of the employee. The funds can be used for Internal Revenue Code §213 eligible expenses. The term PCA is a Humana marketing term for the IRS HRA (Health Reimbursement Arrangement) product.

FSA—Flexible Spending Account; an account that is funded with employee pre-tax dollars. The funds can be used for Internal Revenue Code §213 eligible expenses.

HRA—Health Reimbursement Arrangement; an account that is funded with employer dollars used by an employee for eligible healthcare expenses and considered tax free to the employee as defined by the IRS. The funds can be used for Internal Revenue Code §213 eligible expenses. Humana uses the marketing term PCA (Personal Care Account) as a synonym to the IRS term HRA.

OTC—Over the counter medicines consumers can purchase without a prescription.

MCC—Merchant category code, restricts the types of merchants from which purchases can be made.

Auto-Substantiation-Receiving and matching claims data to verify IRS eligibility of such expenses made with the HumanaAccess card. The new logic which reduces the need for members to provide receipts when they use their HumanaAccess cards for eligible expenses.

IRS Rev. Rul. 2003-43 and 2006-69-Set auto—adjudication standards (i.e., copay match, recurring expense, or real time substantiation). The benefit card is programmed consistent with these requirements so that only expenses incurred at health care merchants are approved.

Paid Claims Accumulator—Amounts for claims that are adjudicated based on medical/dental/third party plan eligible expenses and adequately substantiated under non-electronic payment card techniques (EOB rollover) create the paid claims accumulator. The accumulator is subsequently reduced as additional claims are electronically submitted by electronic card swipe.

Humana and many other carriers and third-party administrators have been in the healthcare debit card business for a number of years. Healthcare debit cards are used by Humana for its FSA, HRA and HSA spending account products. Humana issues cards under the HumanaAccess card brand name and has greater than 150,000 cards in the market today (December 2006) with three different issuing bank partners—UMB, Bank of America, and JP Morgan Chase.

Under current electronic payment card arrangements, a large number of otherwise eligible claims fail to qualify for the somewhat narrow auto-adjudication/substantiation standards set forth in IRS Rev. Rul 2003-43 and IRS Rev. Rul. 2006-69. In many cases, the charges fail to fit one of the three established categories because multiple copay charges are submitted on a single card swipe, Examples of swipes that may not auto-substantiate are: Card transactions where the amount is not an exact match to the EOB medical claim record due to combining copay amounts for multiple family members, or situations where the card transaction occurs after the date the service was incurred.

Humana's prior auto-substantiation logic design auto-substantiates approximately 45% of medical card swipes. Dental and Vision auto-substantiate at significantly lower rates due to a lack of claims data typically for card transactions within those categories. Because of this, Humana spends greater than $25,000.00 per month (calculated in terms of the dollar value of the time spent) on manually substantiating card swipes to reduce a negative consumer experience by preventing subscribers from receiving letters requesting substantiation for claims that should be substantiated since Humana has information on the claim.

This invention currently applies to FSAs and HRAs only and does not apply to HSAs, as it is not currently required to substantiate HSAs. However, the accumulators, comparisons and logical processing established by this invention could be applied to substantiate payments under any account (HSA, MSA or other tax advantaged spending or savings account) using debit or other cards including credit or hybrid card approaches.

Figure 2:
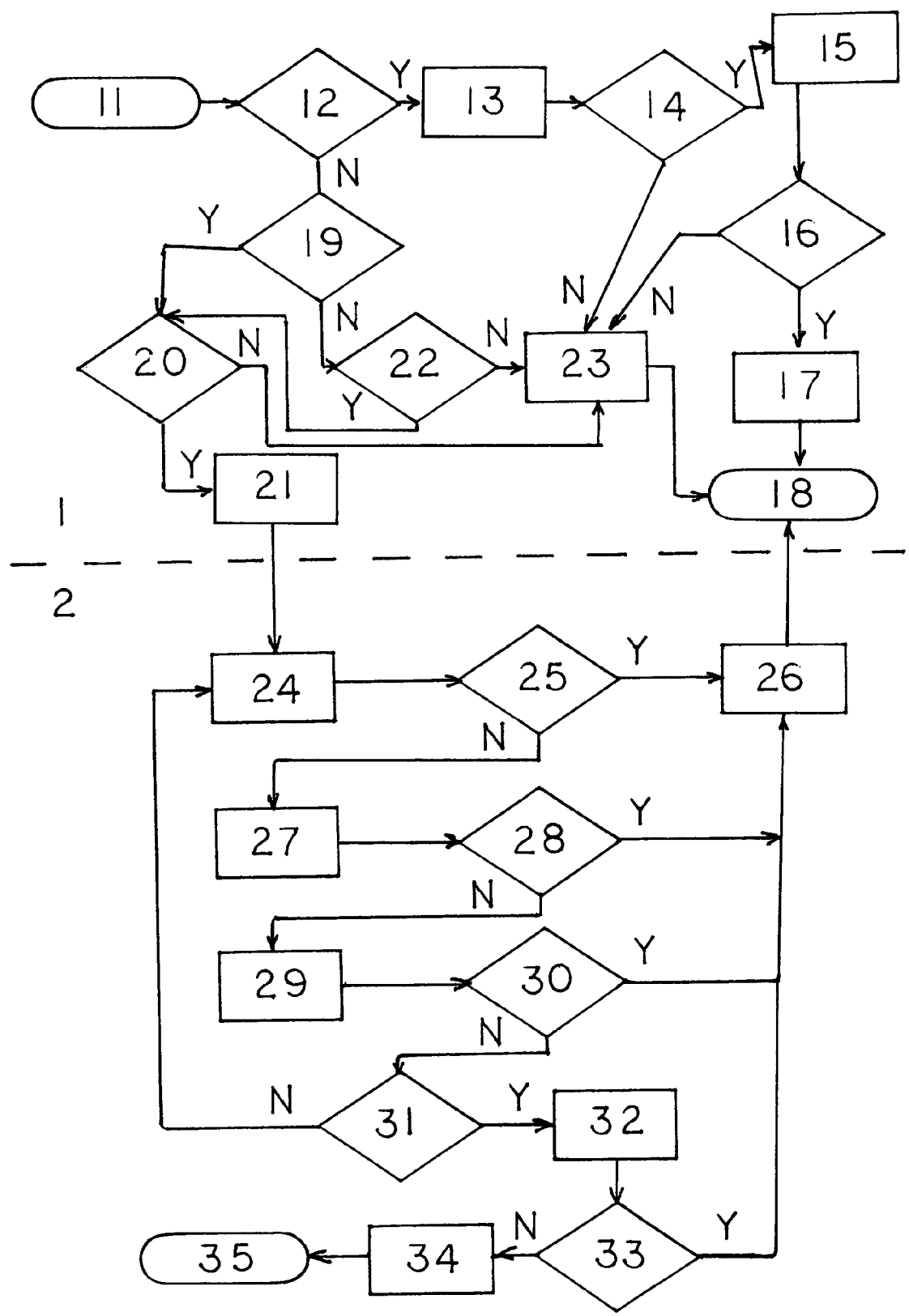
FIG. 2 shows Humana's transaction approval and modified substantiation logic including accumulator logic processing for substantiation.

Modified Auto-Substantiation Logic:

With reference to FIGS. 1 and 2, the figures are the same except for the items numbered 32 and 33. These items 32 and 33 represent the accumulator logic used for approved transaction substantiation after a period of X days where, in those X days, the approved transaction was not otherwise substantiated. In FIGS. 1 and 2, the portion 1 above the dashed line at mid-page shows the point of sale process logic and the portion 2 below the dashed line at mid-page shows the back-end process logic. In FIGS. 1 and 2, the letter "Y" represents "yes" and the letter "N" represents "no" for the various decision points. Items 11-35 are as follows:

11—Start.

12—Pharmacy MCC?

13—Check for PBM authorization for this member card transaction equal exact dollar amount of authorization or sum of authorizations equal exact dollar amount of card transaction.

14—Match?

15—Transaction is auto-substantiated in real-time.

16—Sufficient funds?

17—Approve the transaction.

18—Stop.

19—Valid MCC for card program?

20—Sufficient funds?

21—Approve the transaction.

22—Is this merchant ID on the list of approved exception merchant IDs?

23—Transaction is declined at the point of sale.

24—Copay matching logic process (match card transaction to copays of record).

25—Match?

26—Transaction is substantiated.

27—Paid claim matching logic process (match card transactions/sums of card transactions to paid claims or sums of paid claims passed from medical claims systems or third parties).

28—Match?

29—Recurring transaction matching logic process (match card transactions to past card transactions, if this is the third or more at same location for the same amount it is a match).

30—Match?

31—Is this greater than "X" days from the card transaction date?

32—Accumulator logic process—is card transaction sum less than or equal to the paid claim sum?

33—Match?

34—Member request for receipts process initiated, resulting in either manual substantiation or repayment.

35—Stop.

As is shown in FIG. 2, the Humana FSA/HRA/HSA administration system auto-substantiation logic adds an additional layer of substantiation logic to that of FIG. 1—the new accumulator logic layer 32/33. This accumulator logic process is broader than the old exact match/combination match methodologies that were previously employed. The newer broad accumulator logic layer 32/33 of substantiation logic is employed after the more detailed individual and combination match methodologies, if those substantiation methodologies were unsuccessful.

Each claim record passed from Humana's medical/dental claims adjudication systems into Humana's FSA/HRA/HSA administration system accumulates dollars in one of three distinct accumulators, the vision paid claim accumulator, the dental paid claim accumulator, or the medical paid claim accumulator. When card transactions are settled and subsequently relayed into Humana's FSA/HRA/HSA administration system they too are tallied into three distinct accumulators, a vision card swipe accumulator, a dental card swipe accumulator and a medical card swipe accumulator.

When the detailed substantiation matching techniques run, they reduce the paid claims accumulators and card swipe accumulators for any matches that have been made. This reduces the risk of using the same paid claim more than once to substantiate a given card transaction.

The new substantiation logic process compares the paid claims accumulators to the card transaction accumulators for a given benefit category (vision, dental or medical) and marks as substantiated any card transactions counted within the given card transaction accumulator as long as the paid claims accumulator is greater than or equal to the card swipe accumulator for that benefit category. If card transactions are marked as substantiated using this process they will be deducted from the card transaction accumulator and the same total will be deducted from the paid claims accumulator. An illustrative example of the approach is provided below:

| CARD TRANSACTIONS | PAID CLAIMS |
|---|---|
| 1/12 $100 | 1/10 $145 |
| 3/1 $25 | |
| 3/3 $50 | |

If it is assumed that no other card transactions and no other paid claims exist and that the card transactions are all at medical merchant category codes then the 1/10 paid claim with $145 of member responsibility would be used to auto-substantiate both the 1/12 card transaction and the 3/1 card transaction. The claim would not however be used to auto-substantiate the 3/3 card transaction because $125 of the $145 paid claim amount would have already been used up in auto-substantiating the other two card transactions leaving only $20 left to be used to auto-substantiate potential future card transactions.

A new substantiation type labeled "Accumulation", with type code "10" is used within Humana's FSA/HRA/HSA administration system to mark transactions substantiated using this technique.

If a paid claim accumulator is less than its associated card swipe accumulator, the following occurs:

Claims that could not be marked as substantiated pend and hold for 30 days. This 30 day figure is the "X" value in item 31 of FIGS. 1 and 2. The 30 day figure is a user configurable parameter and can be set to a higher or lower number based on the business need. If more paid claims are added to the appropriate paid claims accumulator within the 30 days, and the sum of the paid claims value that is added makes that accumulator greater than or equal to the appropriate card swipe accumulator, the associated card swipes would be considered auto-substantiated. If the amount in the paid claims accumulator does not meet or exceed the amount of the card swipe accumulator in 30 days, a substantiation letter detailing the unsubstantiated claim(s) would be sent to the subscriber one time per month.

Modifications to the auto-substantiation logic to include the accumulation technique resulted in improvements to the percentage of auto-substantiated card transactions for medical claims from approximately 45% to approximately 80%. This increase has reduced manual efforts to manually substantiate member card transactions, reduced time taken for answering incoming substantiation issues calls, and improved overall administrative costs for Humana. This has also enhanced the consumer experience by reducing requests for receipts.

Looking to the auto-substantiation logic: Paid claims data for medical claims have the associated member responsibility amounts from eligible paid medical claims records assigned to the medical paid claims accumulator for the associated plan year. Paid medical claims are accumulated for all dependent members under a given subscriber's plan. A single paid claims accumulator functions for all dependent members under that subscriber's plan. The paid medical claims accumulator is reset to zero at the end of the plan year.

Paid claims data for dental claims have the associated member responsibility amounts from eligible paid dental claims records assigned to the dental paid claims accumulator for the associated plan year. Paid dental claims are accumulated for all dependent members under a given subscriber's plan. A single paid claims accumulator functions for all dependent members under that subscriber's plan. The paid dental claims accumulator is reset to zero at the end of the plan year.

Paid claims data for vision claims have the associated member responsibility amounts from eligible paid vision claims records assigned to the vision paid claims accumulator for the associated plan year. Paid vision claims are accumulated for all dependent members under a given subscriber's plan. A single paid claims accumulator functions for all dependent members under that subscriber's plan. The paid vision claims is reset to zero at the end of the plan year.

Card swipe amounts are mapped by MCC to the appropriate card swipe accumulator (medical/Durable Medical Equipment (DME), dental, and vision).

Card swipe accumulators are compared to paid claim accumulators by claim type. If the paid claims accumulator is greater than or equal to the card swipe accumulator then the card transactions accounted for in the card swipe accumulator are marked as substantiated. Existing substantiation matching logic is used prior to accumulator logic for card transaction substantiation purposes. Those claims and swipes that have been substantiated by the existing matching logic are removed from consideration by the accumulator logic. Accumulator logic utilizes a first in first out methodology for substantiating card transactions. Example:

| CARD TRANSACTIONS | PAID CLAIMS |
| --- | --- |
| 1/15 $20 | $85 |
| 2/21 $25 | |
| 3/30 $50 | |

In this example the single paid claim for $85.00 will be used to substantiate the first two card transactions (1/15 for $20.00 and 2/21 for $25.00 to total $45) but is not sufficient to be used to substantiate the third card transaction on 3/30, which brings the total to $95 which is greater than the $85 single paid claim.

This ensures that when requests for receipts are sent to members they are sent for the most recent (after the 29 day holding period) card transactions not substantiated by any substantiation process.

Card transactions marked as substantiated are removed from the card transaction accumulator totals. The paid claims accumulator totals are also reduced if those paid claims are used to auto-substantiate transactions.

Paper claims submitted and adjudicated within Humana's FSA/HRA/HSA administration system reduce the paid claims accumulator for that benefit category (medical, dental, vision) to avoid double-dipping of available, accumulated dollars.

A new substantiation type id within Humana's FSA/HRA/HSA administration is used to mark transactions substantiated using the accumulator logic.

Humana's accumulator auto-substantiation logic does not add applicable copay amounts included in member responsibility to the paid claims accumulator or to the card transaction accumulator.

Humana's auto-substantiation logic reviews the paid claims data that populates the paid claims accumulator to ensure that Humana is not accumulating dollars for duplicate claims, coordination of benefits where Humana is the secondary payer, ineligible dependent, pre-estimate of benefits on dental claims, etc.

External paid claims data from third parties may be loaded to Humana's FSA/HRA/HSA administration system for use in auto-substantiating card transactions when an employer group uses a third party for portions of it's benefits such as outsourced mental health, dental or vision benefits.

Existing substantiation logic of FIG. 1 continues to operate as is and new logic has been added as a secondary substantiation technique as shown in FIG. 2. Claims matched in the other substantiation processes are not added to accumulators. Also, the existing real-time substantiation processing logic for pharmacy transactions is unaffected by the paid claims accumulator auto-substantiation process.

Looking in more detail at FIGS. 1 and 2, the portion 1 above the dashed line is the point of sale process, which starts at 11 with the plan member swiping his electronic benefit card. The first decision branch 12 checks to see if the card swipe is at a pharmacy MCC. If so, then at 13 you check for PBM authorization for this member card transaction to see if the exact dollar amount of authorization or the sum of authorizations equal the exact dollar amount of the card transaction. For example, a member could be purchasing two prescriptions at his pharmacy. The first could have, for example, a $25 copay and the second could have, for example, a $40 copay. The member would be expected to be swiping his card for the sum of the two copays, or for $65. The decision branch at 14 checks this and if there is a match, at 15 the transaction is auto-substantiated in real-time. After auto-substantiation, the next test, at 16, is to see if there are sufficient funds in the member's account to which the electronic benefit card is linked. In the example, if the member has at least $65 in the account, then, at 17, the transaction is approved, and, at 18, the pharmacy transaction/substantiation is complete and stops. If the PBM authorization at 13 was $65 and the card swipe was for a different dollar amount, then, at 23, the transaction would be declined at the point of sale. Also, if at decision point 16, the member does not have $65 in the account, then there are insufficient funds to pay the substantiated pharmacy claim and, at 23, the transaction is declined at the point of sale and the member must pay for his prescriptions using alternative payment means. So, pharmacy transactions must be exact matches at the time of the transaction if the transaction is to be substantiated.

We next turn to transactions not involving pharmacy transactions, such as for example, medical, vision, and dental transactions. In this situation, the test for a pharmacy MCC at 12 would result in a No, which would take us to decision point 19 to see if this is a valid MCC for the member's card program. If, at 19, the card swipe is at a valid MCC for the card program, then the next decision point, at 20, is to test to see if the member has sufficient funds in the account to which the electronic benefit card is associated. If so, then, at 21, the transaction is approved and the card swipe amount paid. If there are not sufficient funds, then, at 23, the transaction is declined at the point of sale. If, at 19, there was not a valid MCC for the card program, then at 22, there is a decision point to see if this merchant ID is on a list of approved exception merchant IDs. If so, then you move to item 20 to see if there are sufficient funds and follow the approval at 21 or decline at 23 as previously described. If not, then the transaction is declined at 23. The non-pharmacy transactions approved at 21 now proceed to the back-end process, as shown in portion 2 below the dashed line in FIGS. 1 and 2.

The back-end substantiation process 2 is set up preferably to be a batch process which is run daily on a computer. Before getting to the accumulator logic process 32/33, the back-end process will attempt other matching logic for up to a selected number of days from the transaction. This is shown by item 31 where one sees that the substantiation loop is going to run for X days from the transaction date before moving to the accumulator logic process 32/33. For example, X may be set at 30 days, where other substantiation logic is attempted before applying the accumulator logic.

The back-end substantiation process 2 will attempt for up to X days to do copay matching (item 24), paid claims matching (item 27), or recurring transaction matching (item 29). If at anytime during this period of X days the approved transaction amount matches on copay (decision item 25), paid claims (decision item 28), or recurring transactions (decision item 30), then, at 26, the transaction is substantiated, and the substantiation process stops at 18. If, after X days from the transaction, the transaction is not substantiated by copay, paid claims, or recurring transactions matching, then the accumulator logic 32/33 is attempted.

In the copay matching logic process at 24/25, the approved transaction amount must match one of the copays of record for that member's plan in order to be substantiated. In the paid claims matching logic at 27/28 the card transactions at one location must match the paid claims or sums of paid claims in order to be substantiated. In the recurring transaction matching logic process at 29/30, the approved transaction amount must be the third or more transaction for the same amount at the same location.

As an example, assume that the plan member has a $25 copay to visit his primary care physician and a $40 copay to visit a specialist. Assume that the member has sufficient funds in his account so that the following transactions will be approved. Assume the following scenario:

1. On day 1, member goes to see his primary care physician. On his way into the visit, he swipes his card for the $25 copay. The primary care physician does some tests and refers the member to a specialist and tells the member to return after seeing the specialist. On the way out of the office, the office assistant tells the member that the member's expected charge for the visit is $75 and the member swipes his card for that amount.
2. On day 4, member goes to see the specialist. On his way into the visit, he swipes his card for the $40 copay. He is not asked to swipe for any additional expected deductible amount.
3. On day 7, the primary care physician processes the claim for member's day 1 visit. The claim is approved and the member is sent an EOB or explanation of benefits showing that the member owed the $25 copay and $80 from his deductible.
4. On day 8, the specialist processes the claim for the member's day 4 visit. The claim is approved and the member is sent an EOB showing that the member owed the $40 copay and that the member owes an additional $100.
5. On day 10, the member goes back to follow-up with the primary care physician. When he gets to the office, he shows them his EOB showing that he owed $80 for the day 1 visit, not the $75 he swiped. So, the member swipes his card for an additional $5. He also swipes for an additional $25, the copay for that day 10 visit.
6. With this scenario, the following substantiation will occur:

| Day 1: | transaction 1 - $25 | accumulator - $0 |
|---|---|---|

When the back-end process runs this day, the $25 transaction 1 copay will match a copay of record and substantiate that transaction.

| Day 1: | transaction 2 - $75 | accumulator - $0 |
|---|---|---|
| Day 4: | transaction 3 - $40 | accumulator - $0 |

When the back-end process runs this day, the $40 transaction 3 copay will match a copay of record and substantiate that transaction.

| Day 7: | claim processed | accumulator - $80 |
|---|---|---|

When the back-end process runs this day, the $75 transaction 2 does not match the $80 claim amount so the claim does not substantiate.

| Day 8: | claim processed | accumulator - $180 |
|---|---|---|
| Day 10: | transaction 4 - $5 | |
| Day 10: | transaction 5 - $25 | |

When the back-end process runs this day, the $75 transaction 2 amount and the $5 transaction 4 amount at the same doctor total to $80 and match the $80 claim amount processed on day 7 so this amount will claim match and substantiate those two transactions and the accumulator will reduce to $100. Also, when the back-end process runs this day, the $25 transaction 5 copay will match a copay of record and substantiate that transaction. The member now has $100 sitting in the accumulator resulting from approval of the claim related to the visit to the specialist on day 4, but not using his electronic benefit card to pay that $100 deductible amount. That amount will sit in the accumulator until needed to substantiate a transaction that is not otherwise substantiated within X days.

The recurring transaction matching logic of 29/30 is often used with durable medical equipment purchases or purchases where a plan member goes to the same place and buys the same thing repetitively. After two purchases for the same amount at the same location, then for the third and subsequent purchases for that same amount at the same location, the transaction amount will substantiate under this logic process. For example, assume that the member needs a knee bandage every week and goes to the same location and spends Y amount for that bandage. The third and subsequent time that Y amount is swiped at that same location, the Y amount transaction will substantiate.

Where after X days an approved transaction has not substantiated either under the copay matching logic of 24/25, the paid claims matching logic of 27/28, or the recurring transaction matching logic of 29/30, the accumulator logic may be used to substantiate the transaction. In the scenario above, assume that the member purchased his first knee brace for $37 on day 12 and that there have been no other transactions or claims processed as of day 42. Because the accumulator has a $100 balance, when the back-end process is run on day 43, the $37 transaction for the knee brace will substantiate and the accumulator will reduce to $63 under the accumulator logic of 32/33. If the knee brace cost $110 and the accumulator had $100, the accumulator logic would not substantiate the transaction because the transaction amount is greater than the accumulator amount. In this situation, in item 34, the member request for receipts process is initiated. Here, the member will be asked to provide receipts for manual substantiation or to repay the transaction amount.

It is noted that the above description has lumped all non-pharmacy transactions and used only one accumulator. However, as is explained above, non-pharmacy transactions are subdivided into medical transactions, vision transactions, and dental transactions and separate accumulators are maintained for each.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A method attempting to substantiate at least one approved benefit card transaction, comprising the steps of:
   a. establishing at least one paid claims accumulator representing amounts for claims substantiated under non-electronic payment card techniques;
   b. establishing at least one card swipe accumulator representing amounts for approved electronic benefit card transactions;
   c. establishing a period of X days;
   d. submitting at least one approved benefit card transaction for an amount B and increasing the at least one card swipe accumulator by the amount B;
   e. verifying, by a computer, that each of the at least one approved transaction is not otherwise substantiated X days after submission of the approved transaction, then resolving the approved transaction by determining if amount B is less than or equal to the at least one paid claims accumulator:
      1. if so, substantiating the approved transaction, reducing the at least one paid claims accumulator by the amount B, and reducing the at least one card swipe accumulator by the amount B;
      2. if not, initiating a request process for member receipt for manual substantiation.

2. The method of claim 1, where:
   a. in the step of establishing at least one paid claims accumulator, at least one of a medical paid claims accumulator, a vision paid claims accumulator, and a paid claim dental accumulator is established;
   b. in the step of establishing at least one card swipe accumulator, at least one of a medical card swipe accumulator, a vision card swipe accumulator, and a dental card swipe accumulator is established
   c. each of the at least one approved transaction is identified as a medical, a vision, or a dental transaction category; and
   d. the substantiation of each of the at least one approved transaction amount B is against the value of the appropriate paid claims accumulator for that transaction category.

3. The method of claim 1, where, for the period of X days after submission of each of the at least one approved transaction, other processes are used to attempt to otherwise substantiate the approved transaction; those other processes including a copay matching logic process, a paid claims matching logic process, and a recurring transaction matching logic process.

4. The method of claim 3, where the copay matching logic process substantiates the approved transaction if the amount B is an exact match to a copay amount of record.

5. The method of claim 3, where the paid claim matching logic process substantiates the approved transaction or multiple approved transactions if either the approved transaction amount B or the sum of multiple approved transactions from a same location is an exact match to a single paid claim amount or sums of multiple paid claim amounts.

6. The method of claim 3, where the recurring transaction matching logic process substantiates the approved transaction if the transaction amount B is at least the third transaction for that exact amount B from a same location.

7. The method of claim 1, where the period of X days is established by a user.

8. The method of claim 1, where the at least one accumulator is reset at the end of a plan year.

9. A method attempting to substantiate at least one benefit card transaction, comprising the steps of:
   a. establishing at least one accumulator containing variable A, the variable A representing the difference in previously substantiated amounts and approved transaction amounts;
   b. establishing a period of X days;
   c. submitting a benefit card transaction for an amount B;
   d. verifying, by a computer, that the transaction is not otherwise substantiated X days after submission of the transaction, then resolving the transaction by determining if amount B is less than or equal to the amount A:
      1. if so, substantiating the transaction and reducing the at least one accumulator by the amount B;
      2. if not, initiating a request process for member receipt for manual substantiation.

10. The method of claim 9, where:
    a. in the step of establishing at least one accumulator, at least one of a medical accumulator, a vision accumulator, and a dental accumulator is established;
    b. the transaction is identified as a medical, a vision, or a dental transaction category; and
    c. the substantiation of the transaction amount B is against the value of the appropriate accumulator for that transaction category.

11. The method of claim 9, where, for the period of X days after submission of the transaction, other processes are used to attempt to otherwise substantiate the transaction; those other processes including a copay matching logic process, a paid claims matching logic process, and a recurring transaction matching logic process.

12. The method of claim 11, where the copay matching logic process substantiates the transaction if the amount B is an exact match to a copay amount of record.

13. The method of claim 11, where the paid claim matching logic process substantiates the transaction or multiple approved transactions if either the transaction amount B or the sum of multiple transactions from a same location is an exact match to a single paid claim amount or sums of multiple paid claim amounts.

14. The method of claim 11, where the recurring transaction matching logic process substantiates the transaction if the transaction amount B is at least the third transaction for that exact amount B from a same location.

15. The method of claim 9, where the period of X days is established by a user.

16. The method of claim 9, where the at least one accumulator is reset at the end of a plan year.

17. A method attempting to substantiate at least one transaction using an electronic benefit card, comprising the steps of:
    a. establishing at least one accumulator containing a variable A, the variable A representing the difference in previously substantiated amounts and approved transaction amounts;
    b. establishing a period of X days;

c. submitting at least one transaction in for an amount B using an electronic benefit card;
d. determining if a merchant category code associated with each of the at least one transaction is a pharmacy merchant category code:
  1. if so, proceeding to step e for the transaction under consideration;
  2. if not, proceeding to step g for the transaction under consideration;
e. determining if a pharmacy benefit manager authorization amount or sum of pharmacy benefit manager authorization amounts equal amount B:
  1. if so, substantiating the transaction and proceeding to step f;
  2. if not, declining the transaction and proceeding to step o;
f. determining whether an account associated with the electronic benefit card contains sufficient funds to pay amount B:
  1. if so, completing the transaction and proceeding to step o;
  2. if not, declining the transaction and proceeding to step o;
g. determining if a merchant category code associated with the transaction is a merchant category code valid for a card program associated with the electronic benefit card:
  1. if so, proceeding to step i;
  2. if not, proceeding to step h;
h. determining if a merchant ID associated with the transaction is on a list of approved merchant IDs:
  1. if so, proceeding to step i;
  2. if not, declining the transaction and proceeding to step o;
i. determining whether the account associated with the electronic benefit card contains sufficient funds to pay amount B:
  1. if so, establishing the transaction as an approved transaction and proceeding to step j;
  2. if not, declining the transaction and proceeding to step o;
j. determining if the amount B is an exact match to a copay amount of record:
  1. if so, substantiating the approved transaction, subtracting the amount B from variable A, and proceeding to step o;
  2. if not, proceeding to step k;
k. determining if either the amount B or a sum of multiple approved transactions amounts from a same location is an exact match to a single paid claim amount or sums of multiple paid claim amounts:
  1. if so, substantiating the approved transaction, subtracting the amount B from variable A, and proceeding to step o;
  2. if not, proceeding to step l;
l. determining if the transaction amount B is at least the third transaction for that exact amount B from a same location:
  1. if so, substantiating the approved transaction, subtracting the amount B from variable A, and proceeding to step p;
  2. if not, proceeding to step m;
m. verifying, by a computer, if X days have passed from submission of the transaction,
  1. if so, proceeding to step n;
  2. if not, proceeding to step j;
n. resolving the approved transaction by determining if amount B is less than or equal to amount A:
  1. if so, substantiating the approved transaction and subtracting the amount B from variable A;
  2. if not, initiating a request process for member receipt for manual substantiation;
o. stopping the method for the transaction under consideration.

18. The method of claim 17, where:
a. in the step of establishing at least one accumulator, at least one of a medical accumulator, a vision accumulator, and a dental accumulator is established;
b. each transaction of the at least one transaction is identified as a medical, a vision, or a dental transaction category;
c. the substantiation of the approved transaction amount B in step j is against the value of the appropriate accumulator variable A for that transaction category;
d. the substantiation of the approved transaction amount B in step k is against the value of the appropriate accumulator variable A for that transaction category; and
e. the substantiation of the approved transaction amount B in step l is against the value of the appropriate accumulator variable A for that transaction category.

19. The method of claim 17, wherein the at least one transaction is a plurality of transactions.

20. The method of claim 19, wherein the plurality of transaction are submitted over more than one day.

* * * * *